United States Patent
Huang et al.

(10) Patent No.: US 11,158,042 B2
(45) Date of Patent: Oct. 26, 2021

(54) OBJECT DEFECT DETECTION

(71) Applicant: International Business Machines Corporation, Armonk, NY (US)

(72) Inventors: Jing Chang Huang, Shanghai (CN); Guo Qiang Hu, Beijing (CN); Peng Ji, Shanghai (CN); Jun Zhu, Shanghai (CN); Yuan Yuan Ding, Shangahi (CN)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 16/507,498

(22) Filed: Jul. 10, 2019

(65) Prior Publication Data

US 2021/0012474 A1    Jan. 14, 2021

(51) Int. Cl.
  *G06T 7/00* (2017.01)

(52) U.S. Cl.
  CPC .... *G06T 7/001* (2013.01); *G06T 2207/20224* (2013.01); *G06T 2207/30121* (2013.01)

(58) Field of Classification Search
  CPC ............ H01L 51/0031; H01L 51/5253; H01L 51/0005; G06T 11/206; G06T 11/001; G06T 11/60; G06T 7/0004; G06T 7/001; G06T 7/0008; G06T 7/0002; G06T 2200/24; G06T 2207/10028; G06T 2207/30121; G06T 2207/10024; G06T 2207/20072; G06T 2207/20224; G06T 2207/30148; G06T 2207/30164; G06T 2207/30242
  See application file for complete search history.

(56) References Cited

U.S. PATENT DOCUMENTS

| | | | |
|---|---|---|---|
| 6,219,443 B1 | 4/2001 | Lawrence | |
| 7,987,150 B1 * | 7/2011 | Luu | G06N 5/025 706/47 |
| 2002/0113234 A1 * | 8/2002 | Okuda | G01N 21/9501 257/48 |
| 2005/0255611 A1 * | 11/2005 | Patterson | G01R 31/2894 438/14 |

(Continued)

OTHER PUBLICATIONS

Kwak et al, "Automatic Inspection of Salt-and-Pepper Defects in OLED Panels Using Image Processing and Control Chart Techniques," SpringLink, Feb. 13, 2017, 6 pages.

*Primary Examiner* — Carol Wang
(74) *Attorney, Agent, or Firm* — Patterson + Sheridan, LLP

(57) ABSTRACT

Embodiments of the present disclosure relate to object defect detection. In an embodiment, a computer-implemented method is disclosed. According to the method, for a test image of at least one part of a target object, a reference image is generated by repeating a periodic pattern detected in the test image, the target object consisting of elements. A differential image is determined by comparing the test image and the reference image. The differential image is superimposed on a predefined grid image to obtain a superimposed image. The grid image comprises grids corresponding to elements of a reference object associated with the target object. The number of defective elements is determined in the at least one part of the target object based on the superimposed image. In other embodiments, a system and a computer program product are disclosed.

20 Claims, 7 Drawing Sheets

(56) References Cited

U.S. PATENT DOCUMENTS

| | | | |
|---|---|---|---|
| 2006/0215901 A1* | 9/2006 | Nakagaki | G06T 7/001 |
| | | | 382/149 |
| 2009/0082979 A1* | 3/2009 | Sato | G01R 31/2831 |
| | | | 702/59 |
| 2009/0096770 A1 | 4/2009 | Kawabe | |
| 2009/0290785 A1 | 11/2009 | Kang et al. | |
| 2010/0241380 A1* | 9/2010 | Cookson | G06T 7/0004 |
| | | | 702/84 |
| 2011/0075937 A1* | 3/2011 | Tate | G06K 9/3275 |
| | | | 382/218 |
| 2011/0293882 A1* | 12/2011 | Kerr | C04B 35/6263 |
| | | | 428/116 |
| 2019/0080446 A1* | 3/2019 | Kuzmin | G06T 15/00 |

* cited by examiner

US 11,158,042 B2

OBJECT DEFECT DETECTION

BACKGROUND

The present invention generally relates to product quality control and more particularly, to a method, system, and product for object defect detection.

Nowadays, in many fields, especially in the manufacturing field, there is a fast-growing demand for automatic visual defect detection. For example, when a smartphone part, printed circuit board (PCB) product, liquid crystal display (LCD) panel, or wafer is manufactured, or when a car has been finished painting, an image of the product is captured and a defect inspection is performed on the captured image automatically. This automatic inspection improves the efficiency of finding defective products.

SUMMARY

According to one embodiment of the present invention, there is provided a computer-implemented method. According to the method, for a test image of at least one part of a target object, a reference image is generated by repeating a periodic pattern detected in the test image, the target object consisting of elements. A differential image is determined by comparing the test image and the reference image. The differential image is superimposed on a predefined grid image to obtain a superimposed image. The grid image comprises grids corresponding to elements of a reference object associated with the target object. The number of defective elements is determined in the at least one part of the target object based on the superimposed image.

According to a further embodiment of the present invention, there is provided a system. The system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
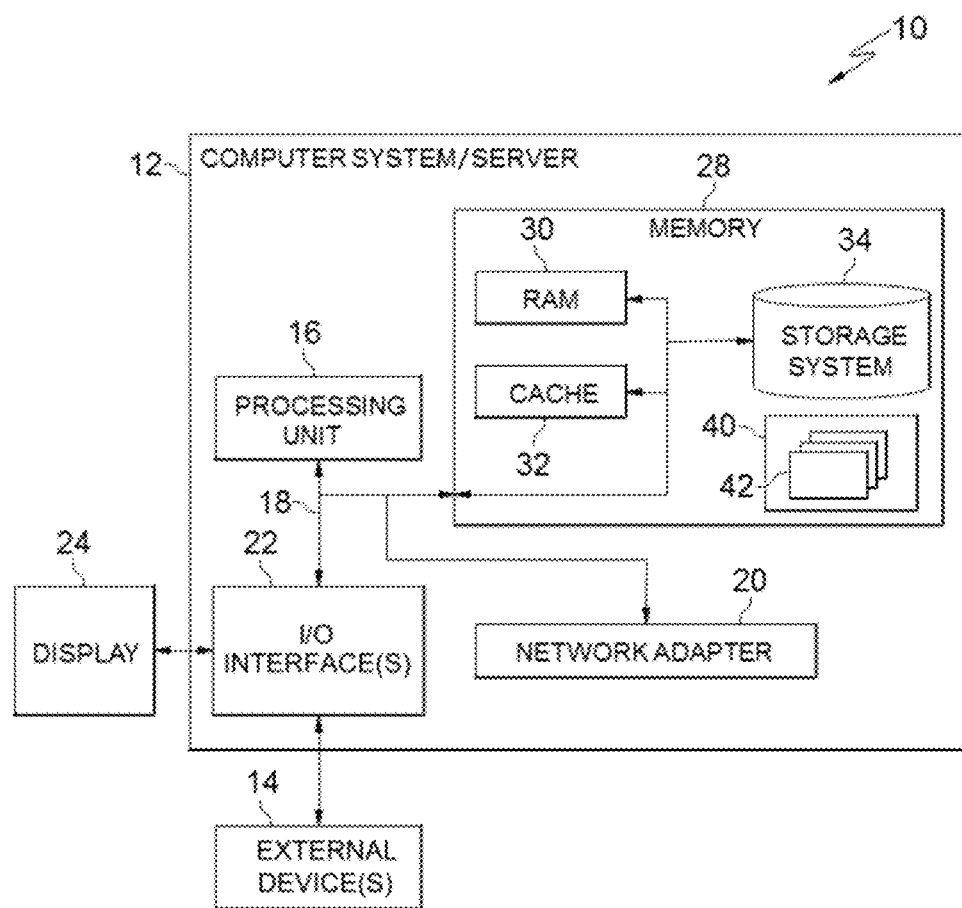
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
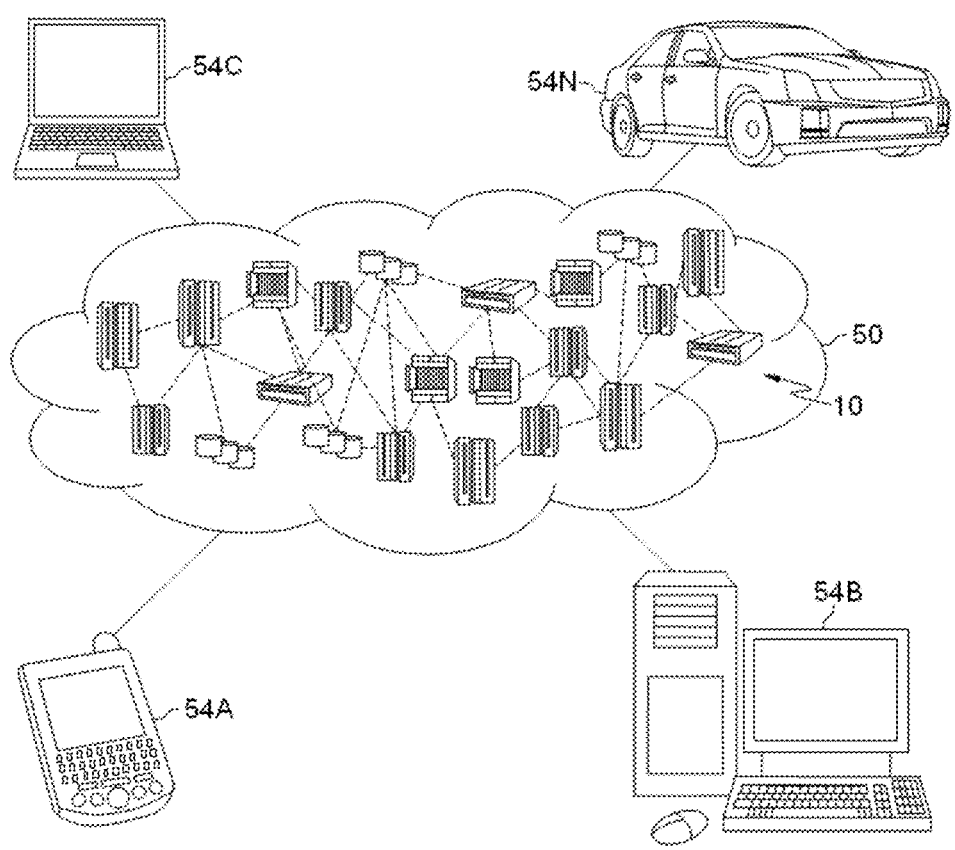
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
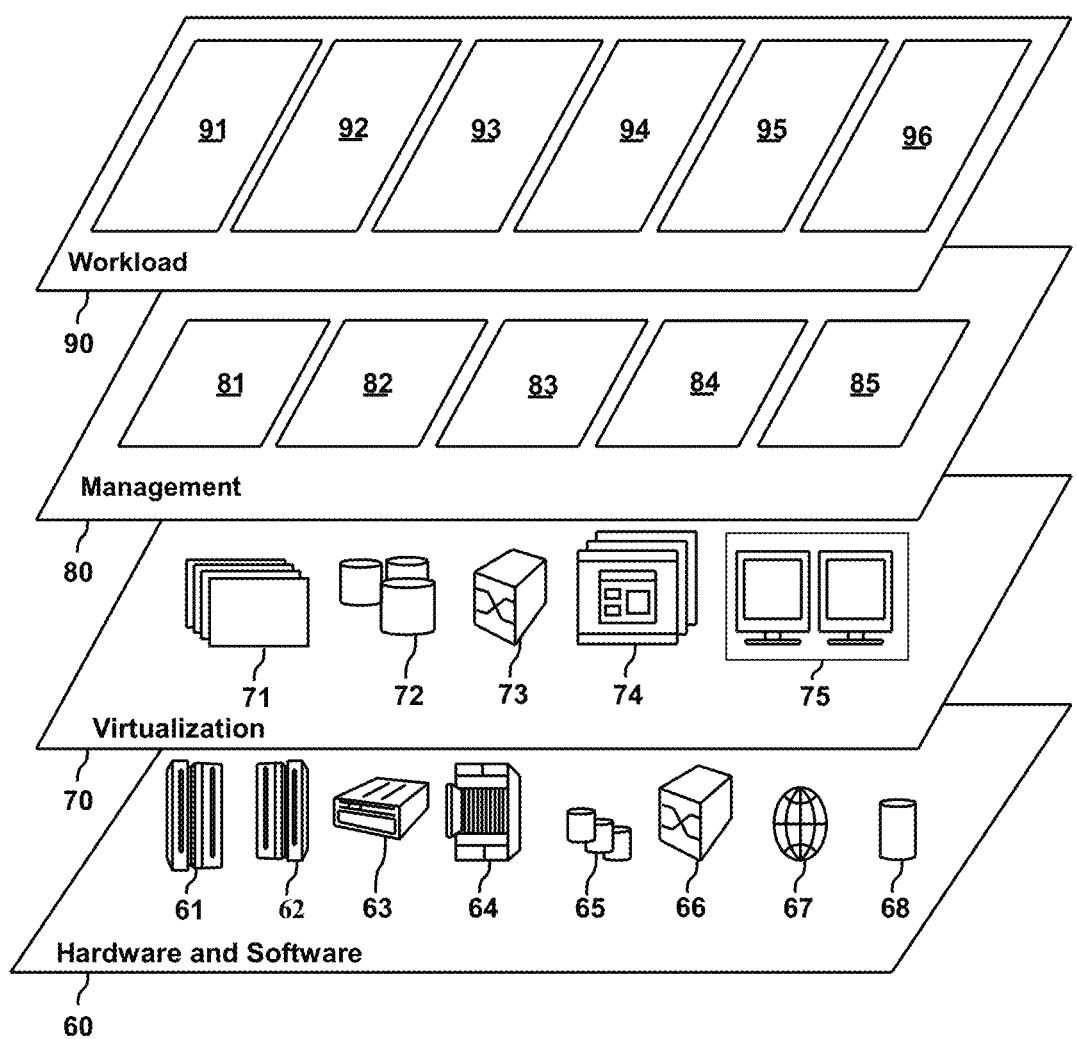
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and object defect detection 96. The functionalities of object defect detection 96 will be described in the following embodiment of the present disclosure.

Object defect detection can be accomplished by manual inspection. For example, to detect possible defective pixel elements in a display panel, one or more test patterns are displayed on the display panel while a person observes the patterns to localize defects. This approach is time-consuming and error-prone. The person must look closely and carefully at the entire screen in order to spot defects, thus adding to the costs associated with the inspection. The inspection accuracy may be fluctuated and uncontrollable from time-to-time when performed by the same person and from person to person when performed by different people.

To reduce human resource costs and to reduce inevitable manual error, as mentioned above, visual detection of object defect is a way to achieve automatic detection. The visual detection requires capturing an image of a target object and analyzing the captured image to detect the defect of the target object appeared in the image. For a target object consisting of elements, such as display panels consisting pixel elements, it is an important task to count how many defective elements (such as bad pixels) included in the target object to evaluate the quality or defect level and determine the next-step action on the target object.

Figure 4:
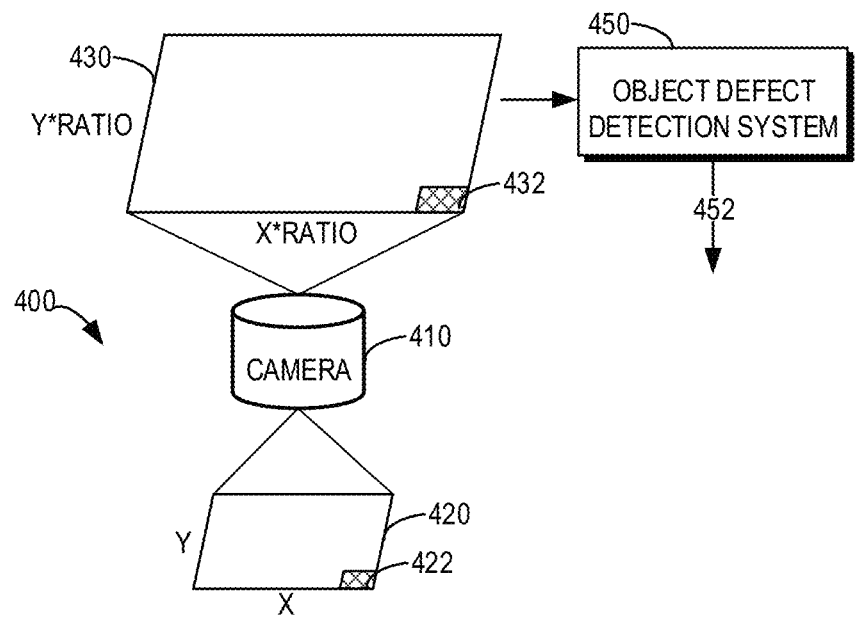
FIG. 4 depicts an environment for object defect detection in which embodiments of the present invention can be implemented.

FIG. 4 depicts an environment 400 for object defect detection in which embodiments of the present invention can be implemented. As shown, to inspect a quality of a target object 420, a camera 410 is used to capture an image 430 of a part of the target object 420 or the whole target object 420. An element 422 in the target object 420 is corresponding to an image block 432 in the captured image 430. In the example where the target object 420 is a display panel, the element 422 may be a pixel element in the display panel, which is then corresponding to the image block 432 consisting of one or more pixels in the image 430.

The number of corresponding pixels contained in the image block 432 may be determined based on a ratio of a resolution of the display panel and a resolution of the image 430 captured by the camera 410. Generally, the camera 410 has a higher resolution than the display panel. For example, if the target object 420, as a display panel, has a resolution of X*Y pixels, and the camera 410 captures the image 430 with a resolution of (X*Ratio)*(Y*ratio) pixels, then the image block 432 corresponding to a pixel element in the panel may include the number of pixels that is equal to the value of "Ratio."

The image 430 is then input to an object defect detection system 450. The system 450 can automatically detect whether the target object 420 based on the image 430. This image 430 may also be referred to as a test image of the target object as it is used to test the quality of the target object.

There have been proposed some solutions to achieve automatic visual defect detection based on images. To ensure the accuracy of the defect detection, most of the solutions require capturing the target object using high-resolution cameras with a high image quality and in some cases even using color cameras (such as RGB cameras). Especially for display panels, this type of detection requires that the camera used to inspect the display panels have a much higher resolution than the display panel being inspected. In most cases, a ratio larger than at least five-to-one of the number of image pixels to the number of display pixels is required in order to properly inspect the display panels.

Figure 5A:
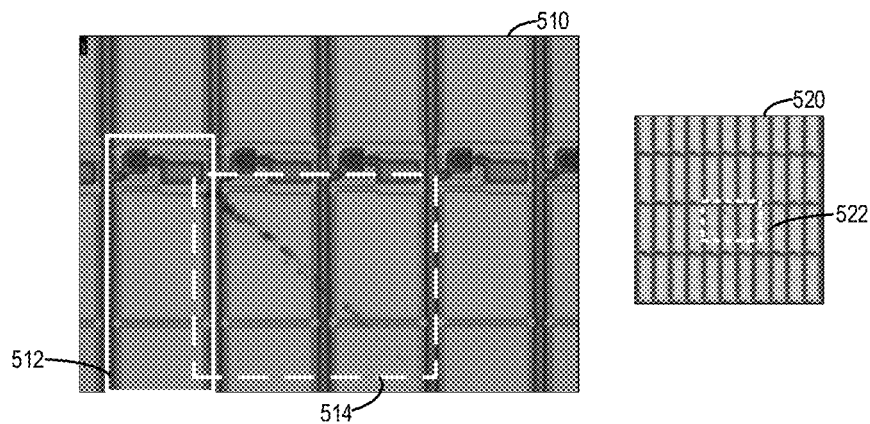
FIGS. 5A and 5B depict examples of comparisons between test images of defect display panels having different resolutions.
Figure 5B:
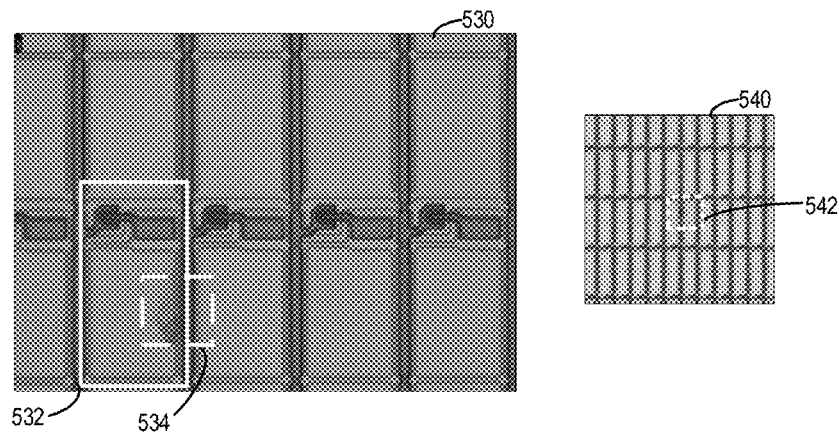

FIG. 5A and FIG. 5B shows two examples of comparisons between test images of defect display panels having different resolutions. In the example of FIG. 5A, a test image 510 of a defect display panel is captured with a resolution of 1024*768 pixels. This test image 510 can cover ten pixel elements of the defect display panel, where an image block 512 is corresponding to one pixel element. The high-resolution image 510 can clearly show defects appeared in two pixel elements of the display panel, as illustrated in an image area 514. As compared with the test image 512, a test image 520 of the same display panel is captured with a lower resolution, such as 128*128 pixels, and about forty-four pixel elements of the display panel are covered in this test image 520. Thus, very few pixels in the image can be assigned to each pixel element in the physical display panel. Due to the low resolution, it is difficult to find in an image area 522 corresponding to the defects in the display panel.

In the example of FIG. 5B, the display panel has only one defective pixel element. A test image 530 with a higher resolution (such as 1024*768 pixels) can also clearly show individual pixel elements of the test image using image blocks 532 where the defective pixel element is clearly shown in an image area 534. However, in a low-resolution image 540 (such as an image with 128*128 pixels), it is much more difficult to find in an image area 542 corresponding to the defect in the display panel due to the low resolution and the small defective panel area.

Although high-resolution and high-quality test images can facilitate the detection accuracy, it is not practical to apply such high-resolution-based solutions due to the great cost of the camera, the high requirement on the image capturing (such as a longer shooting time), and the high requirement on resources for transporting, processing, and storing the high-resolution images. With the development of manufacturing techniques and increase of user demand, the display panels have been manufactured with increasingly higher resolutions, which require that the test images will be captured with much higher resolutions accordingly.

Among the existing solutions based on high-resolution images, some solutions are proposed to measure a difference between a test image of an object to be tested and a corresponding template image of a qualified object. Defects of the object generally appear in the difference area. In this solution, the template image is required to be captured in a same or similar condition with the test image so as to eliminate errors introduced by image capturing difference. This requirement generally cannot be met in practice.

Further, different types of objects may have unique background context. As such, different template images must be constructed and labeled for different types of objects, which is a time-consuming process with complexity. The maintenance of the template images has high complexity and high cost as some new types of objects may be added and some types of objects may be abandoned. In some cases, special background layouts such as unregular layouts or uneven boundaries may make it difficult to achieve high accuracy counting on the number of defective elements from the difference area.

In view of the above, it is found that as compared with the high-resolution camera, a low-resolution camera for image capturing is more applicable for object defect detection in most practical cases. However, the challenges faced with use of low-resolution captured images lie in that in addition to the low resolution per se, image qualities may also be easily affected by environmental factors in real product lines, resulting in image blurriness, color irregularity, unstable light conditions, and the like. Further, it is also desired to use an unsupervised method to achieve more accurate detection results.

In accordance with embodiments of the present invention, there is proposed a solution for object defect detection. In the solution, for a test image that captures at least a part of a target object, a reference image is generated according a self-reference principle by repeating a periodic pattern detected in the test image. A differential image between the test image and the reference image is obtained and superimposed on a grid image associated with the target object. Then, the number of defective elements in at least the part of the target object can be determined based on the superimposed image. Through this solution, it is possible to adaptively construct homogeneous reference images for test images, even for low-resolution and/or low-quality test images. In addition, the utilization of the grid image can lower the requirement on a template image for the target object and can be easily obtained for difference objects with diverse element boundaries and background context/layouts.

The object defect detection will be described in detail below. In some embodiments of the present disclosure below, for purpose of illustrations, a display panel is used as an example of a target object to be inspected. The display panel may be any type of displays, such as liquid crystal display (LCD). However, it would be appreciated that those embodiments may also be applicable to inspect defects of other types of target objects as long as the target objects consists of individual elements and have periodic patterns.

Figure 6:
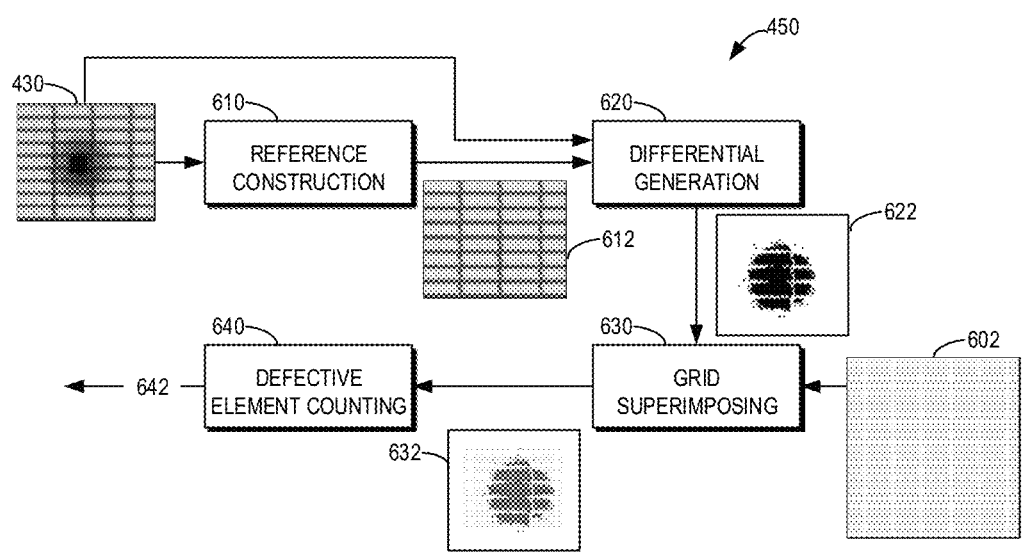
FIG. 6 depicts a block diagram of a system for object defect detection according to an embodiment of the present invention.

Reference is now made to FIG. 6, which shows a object defect detection system according to an embodiment of the present invention. In some embodiments, such object defect detection system can be implemented as the object defect detection system 450 in the environment 400 of FIG. 4. For purpose of illustration, the object defect detection system 450 is described below with reference to FIG. 4.

As shown, according to embodiments of the present invention, the object defect detection system 450 includes a reference construction module 610, a differential generation module 620, a grid superimposing module 630, and a defective element counting module 640. The objection defect detection system 450 may be implemented by computer system/server 12 of FIG. 1 and the modules 610 to 640 in the system 450 may be implemented in software, hardware, middleware, and/or any combination thereof.

Specifically, the reference construction module 610 is configured to generate a reference image 612 for a test image 430. The test image 430 is obtained by the camera 410, which captures a part of the target object 420 to be inspected or the whole target object 420. The part or the whole target object 420 may or may not have one or more defective elements and the test image 430 is used to detect whether the defective element(s) is present and how many defective element(s) is present according to embodiments of the present invention. By way of illustration, the test image 430 in FIG. 6 is shown to include defective elements.

The test image 430 may be captured with any resolution that is higher than the resolution of the target object 420 (where the target object 420 is a display panel). In some embodiments, the test image 430 may be a low-resolution image, which has a resolution that is two times or three times higher than the resolution of the display panel. The test image 430 may also have a resolution that is four or more times higher than the resolution of the display panel. In some embodiments, the test image 430 may be captured by the camera 410 as a grayscale image. Of course, a color test image 430 may also be applicable in some embodiments.

In generating the reference image 612, the reference construction module 610 detects a periodic pattern in the test image 430 and generates the reference image 612 by repeating the periodic pattern. The periodic pattern is a pattern that is repeated in the test image 430 with a certain period. The periodic pattern can be found in a variety of objects. For example, due to natures of the pixel elements in the LCD display panel, repeated patterns appear in almost all the layers for building the LCD.

Figure 7:
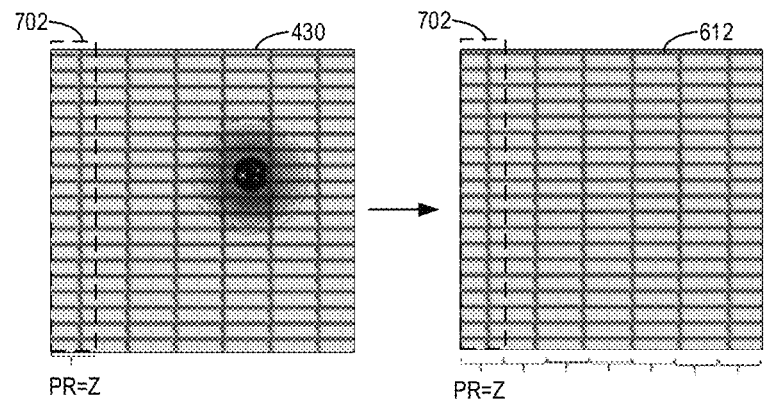
FIG. 7 depicts a schematic example of constructing a reference image according to an embodiment of the present invention.

In some embodiments of the present invention, the periodic information in the test image may be utilized for constructing the reference image. The reference construction module 610 may detect a pattern period from the test image. The pattern period indicating a period of the pattern that is repeated in the test image. Various image analysis methods may be applied to detect the pattern period and the scope of the present invention is not limited in this regard. The reference construction module 610 then identifies a periodic pattern from the test image 430 using the pattern period. As shown in FIG. 7, it can be identified from the test image 430 that the pattern period (denoted as "PR") is Z pixels in a horizontal direction of the test image 430. A periodic pattern 702 may then be determined as a sub-image with a height of a full height of the test image 430 and a width of the pattern period (i.e., Z pixels).

In some embodiments, the periodic pattern 702 may be selected from a predetermined area of the test image 430, such as an area of the test image 430 that has a low probability of having defects. In an embodiment, the predetermined area may be away from the center of the test image 430, such as starting from a pixel near a boundary of the test image 430, so as to ensure that this area is clean. For example, the periodic pattern 702 is selected from the beginning pixel at the left boundary of the test image 430. As such, it is very likely that the selected periodic pattern 702 may be a clean pattern free of any defect.

As the periodic pattern 702 is clean and has no defect, by repeating this periodic pattern 702 with the pattern period as shown in FIG. 7, the reference image 612 is generated as a clean background for further comparison. It is noted that if the pattern period is along the horizontal direction, then the periodic pattern 702 may be also repeated along the horizontal direction. Since the periodic pattern detected from the test image is utilized, the constructed reference image may appear the same or similar visual attributes to the test image, including color, light, texture, resolution, and the like.

It would be appreciated that although the pattern period in FIG. 7 is illustrated along the horizontal direction, in another embodiment, the pattern period may be determined along a vertical direction of the test image 430, such that the periodic pattern is a sub-image having a width of a full width of the test image 430 and having a height of the pattern period. In this embodiment, since the pattern period is along the vertical direction, then the periodic pattern may be also repeated along the vertical direction.

Referring back to FIG. 6, the reference image 612 generated by the reference construction module 610 is then provided to the differential generation module 620. The differential generation module 620 is configured to determine a differential image 622 by comparing the reference image 430 and the test image 612. Since the reference image 430 is aligned with the test image 612 (by means of the pattern repetition), the differential image 622 may be generated by directly compare values of corresponding aligned pixels in the two images.

The differential image 622 may include pixels having binary values, where a first value is used to indicate that corresponding pixels in the reference image 430 and the test image 612 have the same value or have a difference lower than a threshold, and a second value is used to indicate that the corresponding pixels have different values or have a difference exceeding the threshold. In some embodiments, the differential image 622 may be determined as a black-white image. In the shown differential image 622 of FIG. 6, a pixel value of the black color is used to indicate a difference between corresponding pixels in the test image 430 and the test image, and a pixel value of the white color is used to indicate no difference between corresponding pixels.

As the reference image 612 indicates an ideal image of the target object 420 without a defect, the difference between the test image 430 and the reference image 612 may indicate the defect(s) in the target object 420. However, the inventors have found that the defect detection directly from the differential image may cause some false alarms and it is also difficult to count the number of defective elements of the target object 420 from the differential image 622 directly and accurately. In embodiments of the present invention, the differential image 622 is provided for further processing in order to count the number of defective elements.

As shown in FIG. 6, the differential image 622 is provided to the grid superimposing module 630. The grid superimposing module 630 is configured to superimpose the differential image 622 on a predefined grid image 602 to obtain a superimposed image 632. The grid image 602 consists of grids corresponding to elements of a reference object associated with the target object 420. Accordingly, boundaries of the grids are also corresponding to boundaries of the elements (such as the pixel elements) in the reference object. The reference object may be a clean object of the same type of the target object 420 without any defective elements.

Thus, different grid images may be defined for different types of objects that have different pixel boundaries, background context and layouts.

In some embodiments, the grid image 602 may have a resolution higher than or equal to a resolution of the target object 420 (when the target object 420 is a display panel). The resolution of the grid image 602 may be the same or different from that of the test image 430.

In some embodiments, the grids in the grid image 602 may be presented with a uniform color while the boundaries of the grids may be presented with another uniform color. In some embodiments, the color for boundaries of the grids in the grid image 602 is different from the color used in the differential image 622 for indicating a difference between the test image 430 and the reference image 612. In some embodiments, contrasting colors are used to indicate the boundaries of the grids and the difference in the differential image 622. For example, if the black color is used to indicate the difference between the test image 430 and the reference image 612, then the white color is used to indicate the boundaries of the grids in the differential image 622. The different or even contrasting colors may facilitate seperating the defective elements with the distinct boundaries in the superimposed image, as will understood in the following description. In some embodiments, the color for the grids in the grid image 602 may also be different from the color used in the differential image 622 for indicating a difference and of course, different from the color of the boundaries. For example, the color for the grids may be a grey color or any other colors.

For a reference object, in some embodiment, the grid image 602 may be determined from a template image of the reference object. For example, a uniform color may be used to replace image blocks in the template image that are corresponding to elements of the reference object and another uniform color may be used to replace image blocks in the template image that are corresponding to boundaries of the elements of the reference object. As an alternative, the grid image 602 may be defined based on user input and/or configuration parameters of the reference object, without actually capturing a template image of the reference object.

The grid superimposing module 630 may superimpose the differential image 622 onto a match area in the grid image 602 (also referred to as a "first match area" hereinafter for convenience of discussion). The match area may be corresponding to a part of the reference object or the whole reference object that matches with the part or the whole target object 420 captured by the test image 430. The match area may be determined in various manners. As an example, if the test image 430 captures the whole target object 420, the grid image 602 may be aligned with the differential image 622 pixel to pixel. In this case, the whole grid image 602 may be identified as the first match area. In another example, the first match area may be determined based on a position of the part of the target object captured by the test image 630. A match position of the corresponding part of the reference object may then be identified and the area in the grid image capturing the match position may be identified as the first match area.

Alternatively, the first match area may be determined by use of a template image of the reference image. The embodiments of the grid superimposing based on the template image will be described in detail with reference to FIG. 8. As shown, the grid superimposing module 630 includes a template match module 810, a grid match module 820, and an image combining module 830.

Figure 8:
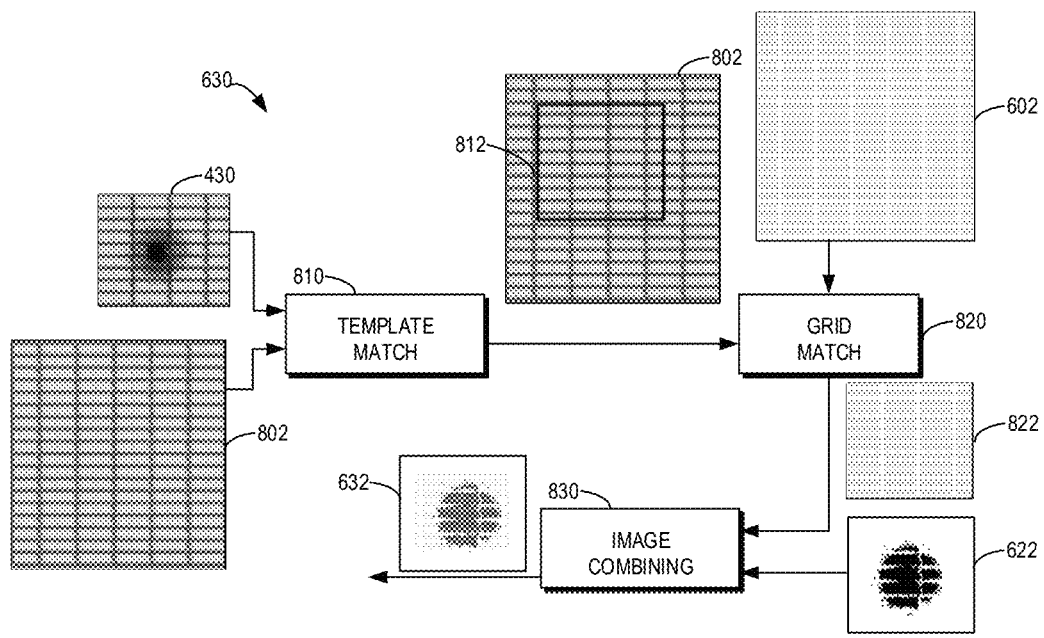
FIG. 8 depicts a block diagram of the grid superimposing module in the system of FIG. 6 according to an embodiment of the present invention.

The template module 810 is configured to match the test image 430 with a template image 802 of the reference object to determine a match area from the template image 802. For convenience of discussion, this match area is also referred to as a "second match area" hereinafter. The template image 802 may be the same image that is used to generate the grid image 602. Since the reference object and the target object are of the same type and having the same pixel boundaries, background contexts, layouts, and the like, it is easily to recognize the second match area that matches with the test image 430 from the template image 802. As illustrated in FIG. 8, a second match area 812 is identified from the template image 802. In some alternative embodiments, the reference image 612 instead of the test image 430 is used to match with the template image 802 to determine the second match area 812.

In some embodiments, the test image 430 (or the reference image 612) may be scaled up or down such that the number of pixels covering an element of the target object 420 in the test image 430 or the reference image 612 is the same as the number of pixels covering an element of the reference object in the template image 802. As such, the test image 430 (or the reference image 612) is comparable with the template image 802.

Figure 9:
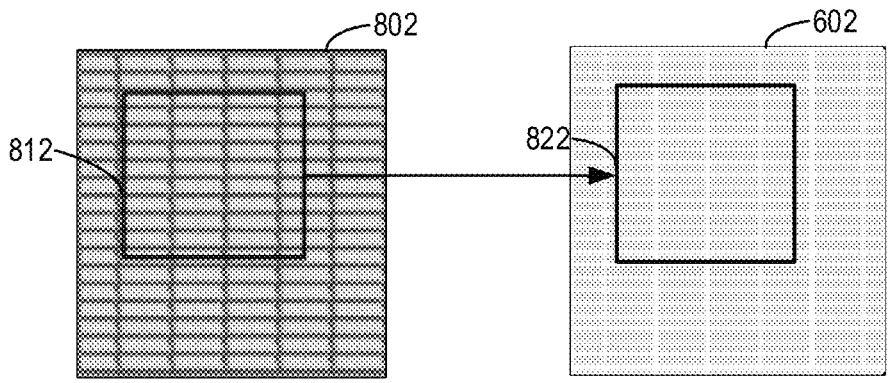
FIG. 9 depicts a schematic example of correspondence between match areas in a template image and a grid image according to an embodiment of the present invention.

The template match module 810 may provide the position of the second match area 812 in the template image 802 to the grid match module 820. The grid match module 820 is configured to determine the first match area 822 in the grid image 602 that is aligned with the second match area 812. The grid image 602 and the template image 802 are typically aligned with each other, having the same resolution. Thus, the first match area 822 has a same relative position in the grid image 602 as the relative position of the second match area 812 in the template image 802, as illustrated in FIG. 9. By selecting the area in the same position from the grid image 602, the first match area 822 may be determined. The first match area 822 is then indicated to the image combining module 830, which is configured to generate the superimposed image 632 by superimposing the differential image 622 on the first match area 822.

In the grid superimposing module 630, by adding the differential image 622 and the grid image 602, the superimposed image 632 can present the difference as indicated by the differential image 622 as well as the grids and boundaries shown in the grid image 602. In some embodiments, the grid superimposing module 630 or specifically the image combining module 830 may combine the differential image 622 and the grid image 602 (specifically, the first match area 822) in a weighted manner. Specifically, the differential image and the first match area are weighted with respective weights and then the weighted differential image and the weighted first match area are combined to obtain the superimposed image 632.

In some embodiments, the respective weights may be set as equal (i.e., 0.5 and 0.5) such that the superimposed image 632 consist of weight averages of corresponding pixel values in the differential image 622 and the first match area 822. In some other embodiments, the respective weights may be set as unequal where a higher weight may be configured to the differential image 622 or the first match area 822 that is expected to be emphasized in the superimposed image 632.

The embodiments for generating the superimposed image 632 have been described above. Referring back to FIG. 6, the superimposed image 632 is then used by the defective element counting module 640 to determine the number of defective elements 642 in the part or the whole target object 420 captured by the test image 430. By means of the superimposed image 632, the number of defective elements may be determined by counting the number of grids that are superimposed by an area of the differential image 622 indicating a difference between the test image 430 and the reference image 612.

Since the area indicating the differences in the differential image 622 may be indicated by specific colors (or pixel values), it can be visually recognized from the superimposed image how many grids are superimposed by the area indicating the difference. As mentioned above, the difference between the test image 430 and the reference image 612 is mainly caused by defective elements occurring in the target object 420. Thus, the higher the number of defective elements is, the higher the number of superimposed grids can be identified from the superimposed mage. In some embodiments, the exact number of defective elements may be simply determined as the number of grids because each grid in the grid image 602 is corresponding to one element in the reference object (and the reference object has the same background context as the target object).

The number of the defective elements may be used to measure a quality of the target object 420. The measurement of the quality may be performed by a separate quality measurement module included in the system 450 (not shown). In some embodiments, a total number of defective elements in the target object 420 is calculated based at least in part on the number of the defective elements detected from the test image 430. If the test image 430 captures the whole target object 420, the determined number of detective elements based on the test image 430 may be determined as the total number of defective elements. If the test image 430 captures only a part of the target object 420, the number of defective numbers in one or more other parts of the target object 420 may be further determined in a similar manner according to the embodiments described herein. Then the total number of defective elements is determined as a sum of all the defective elements detected from the respective parts of the target object 420.

To measure the quality of the target object 420 and determine a next-step action to be performed on the target object 420, the total number of defective elements may be compared with a predetermined threshold. In an embodiment, the predetermined threshold may be set as one threshold that can be used to separate a qualified object and a failed object. This threshold may be set as any suitable values depending on practical requirements. As such, if the total number of defective elements exceeds the threshold, the target object 420 may be determined as a failed object and thus may be discarded; otherwise, the target object 420 may be a qualified objet.

In another embodiment, the total number of defective elements may be determined compared with more than one threshold so as to perform a fine quality measurement on the target object 420 so as to determine a next-step action to be performed on the target object 420. In some examples, different thresholds may be used to measure whether the target object 420 can be discarded, reworked, and/or repaired. As a specific example, if the total number of defective elements is more than ten, the quality of the target object 420 may be determined as such low that it should be discarded. If the total number of defective elements is less than ten but larger than five, it means that the quality of the target object 420 is still low but can be reworked to get it qualified. Moreover, if the total number of defective elements is larger than zero but less than five, it means that the target object 420 can be repaired to get it qualified.

Figure 10:
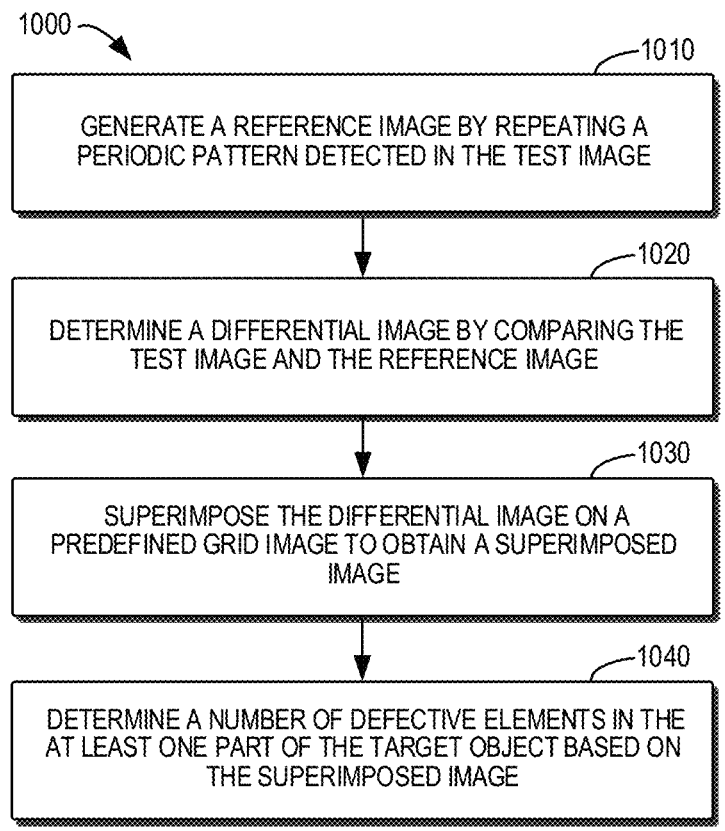
FIG. 10 depicts a flowchart of an example method according to an embodiment of the present invention.

FIG. 10 shows a flowchart of an example method 1000 according to an embodiment of the present disclosure. The method 1000 can be implemented at the object defect detection system 450 as shown in FIG. 6. For the purpose of discussion, the method 1000 will be described from the perspective of the object defect detection system 450 with reference to FIG. 6.

At block 1010, for a test image of at least one part of a target object, the object defect detection system 450 generates a reference image by repeating a periodic pattern detected in the test image. The target object consists of elements. At block 1020, the object defect detection system 450 determines a differential image by comparing the test image and the reference image. At block 1030, the object defect detection system 450 superimposes the differential image on a predefined grid image to obtain a superimposed image, the grid image comprising grids corresponding to elements of a reference object associated with the target object. At block 1040, the object defect detection system 450 determines the number of defective elements in the at least one part of the target object based on the superimposed image.

In some embodiments, superimposing the differential image on the grid image comprises determining a first match area from the grid image for the test image, the match area corresponding to at least one part of the reference object that matches with the at least one part of the target object captured by the test image, and generating the superimposed image by superimposing the differential image on the first match area.

In some embodiments, determining the first match area for the test image comprises determining a second match area from a template image of the reference object by matching the test image or the reference image with the template image, the template image aligned with the grid image and determining the first match area in the grid image that is aligned with the second match area.

In some embodiments, generating the superimposed image comprises weighting the differential image and the first match area with respective weights and combining the weighted differential image and the weighted first match area to obtain the superimposed image.

In some embodiments, the target object comprises a display panel.

In some embodiments, determining the number of defective elements comprises determining the number of grids in the superimposed image that are superimposed by an area of the differential image indicating a difference between the test image and the reference image; and determining the number of defective elements based on the number of grids.

In some embodiments, a first color for boundaries of the grids in the grid image is different from a second color used in the differential image for indicating a difference between the test image and the reference image. In some embodiments, a third color for the grids in the grid image is different from the second color, and the third color is different from the first color.

In some embodiments, generating the reference image comprises: determining a pattern period from the test image, the pattern period indicating a period of the periodic pattern that is repeated in the test image in a predetermined direction, and generating the reference image by repeating the periodic pattern with the determined pattern period in the predetermined direction.

In some embodiments, the method 1000 further comprises determining a total number of defective elements in the target object based at least in part on the determined number of defective elements in the at least one part of the target object; and determining a quality of the target object by comparing the total number of defective elements with a predetermined threshold.

It should be noted that the processing of object defect detection or the object defect detection system according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    for a test image of at least one part of a target object, generating a reference image by repeating a periodic pattern detected in the test image, the target object comprising elements;
    determining a differential image by comparing the test image and the reference image;
    determining, in a grid image comprising grids corresponding to elements of a reference object associated with the target object, a match area corresponding to at least one part of the reference object matching the at least one part of the target object;
    superimposing the differential image on the match area in the grid image to obtain a superimposed image; and
    determining, based on the superimposed image and by operation of one or more computer processors, a number of defective elements in the at least one part of the target object.

2. The computer-implemented method of claim wherein the match area comprises a first match area, wherein determining the first match area comprises:
    determining a second match area from a template image of the reference object by matching the test image or the reference image with the template image, the template image aligned with the grid image; and
    determining the first match area in the grid image that is aligned with the second match area.

3. The computer-implemented method of claim 1, wherein generating the superimposed image comprises:
    weighting the differential image and the first match area with respective weights; and
    combining the weighted differential image and the weighted first match area to obtain the superimposed image.

4. The computer-implemented method of claim 1, wherein the target object comprises a display panel.

5. The computer-implemented method of claim 4, wherein determining the number of defective elements comprises:
    determining a number of grids in the superimposed image that are superimposed by an area of the differential image indicating a difference between the test image and the reference image; and
    determining the number of defective elements based on the number of grids.

6. The computer-implemented method of claim 1, wherein a first color for boundaries of the grids in the grid image is different from a second color used in the differential image for indicating a difference between the test image and the reference image, and wherein a third color for the grids in the grid image is different from the second color, and the third color is different from the first color.

7. The computer-implemented method of claim 1, wherein generating the reference image comprises:
    determining a pattern period from the test image, the pattern period indicating a period of the periodic pattern that is repeated in the test image in a predetermined direction; and
    generating the reference image by repeating the periodic pattern with the determined pattern period in the predetermined direction.

8. The computer-implemented method of claim 1, further comprising:
    determining a total number of defective elements in the target object based at least in part on the determined number of defective elements in the at least one part of the target object; and
    determining a quality of the target object by comparing the total number of defective elements with a predetermined threshold.

9. A system comprising:
    a processing unit; and
    a memory coupled to the processing unit and storing instructions thereon, the instructions, when executed by the processing unit, performing acts including:
        for a test image of at least one part of a target object, generating a reference image by repeating a periodic pattern detected in the test image, the target object comprising elements;
        determining a differential image by comparing the test image and the reference image;
        determining, in a grid image comprising grids corresponding to elements of a reference object associated with the target object, a match area corresponding to at least one part of the reference object matching the at least one part of the target object;
        superimposing the differential image on the match area in the grid image to obtain a superimposed image; and
        determining, based on the superimposed image, a number of defective elements in the at least one part of the target object.

10. The system of claim 9, wherein the match area comprises a first match area, wherein determining the first match area comprises:
    determining a second match area from a template image of the reference object by matching the test image or the reference image with the template image, the template image aligned with the grid image; and
    determining the first match area in the grid image that is aligned with the second match area.

11. The system of claim 9, wherein generating the superimposed image comprises:
    weighting the differential image and the match area with respective weights; and
    combining the weighted differential image and the weighted first match area to obtain the superimposed image.

12. The system of claim 9, wherein the target object comprises a display panel.

13. The system of claim 12, wherein determining the number of defective elements comprises:
    determining a number of grids in the superimposed image that are superimposed by an area of the differential image indicating a difference between the test image and the reference image; and determining the number of defective elements based on the number of grids.

14. The system of claim 9, wherein a first color for boundaries of the grids in the grid image is different from a second color used in the differential image for indicating a difference between the test image and the reference image, and wherein a third color for the grids in the grid image is different from the second color, and the third color is different from the first color.

15. The system of claim 9, wherein generating the reference image comprises:

determining a pattern period from the test image, the pattern period indicating a period of the periodic pattern that is repeated in the test image in a predetermined direction; and generating the reference image by repeating the periodic pattern with the determined pattern period in the predetermined direction.

16. The system of claim 9, wherein the acts further include:

determining a total number of defective elements in the target object based at least in part on the determined number of defective elements in the at least one part of the target object; and determining a quality of the target object by comparing the total number of defective elements with a predetermined threshold.

17. A computer program product being tangibly stored on a non-transient machine-readable medium and comprising machine-executable instructions, the machine-executable instructions, when executed on a device, causing the device to perform acts including:

for a test image of at least one part of a target object, generating a reference image by repeating a periodic pattern detected in the test image, the target object comprising elements;

determining a differential image by comparing the test image and the reference image;

determining, in a grid image comprising grids corresponding to elements of a reference object associated with the target object, a match area corresponding to at least one part of the reference object matching the at least one part of the target object;

superimposing the differential image on the match area in the grid image to obtain a superimposed image; and determining, based on the superimposed image, a number of defective elements in the at least one part of the target object.

18. The computer program product of claim 17, wherein the match area comprises a first match area, wherein determining the first match area comprises:

determining a second match area from a template image of the reference object by matching the test image or the reference image with the template image, the template image aligned with the grid image; and determining the first match area in the grid image that is aligned with the second match area.

19. The computer program product of claim 17, wherein generating the superimposed image comprises:

weighting the differential image and the match area with respective weights; and combining the weighted differential image and the weighted match area to obtain the superimposed image.

20. The computer program product of claim 17, wherein the target object comprises a display panel.

\* \* \* \* \*